United States Patent
Yang et al.

(10) Patent No.: US 10,230,920 B1
(45) Date of Patent: Mar. 12, 2019

(54) ADJUSTING INTERPOLATION PHASE FOR MEMC USING IMAGE ANALYSIS

(71) Applicant: PIXELWORKS, INC., Portland, OR (US)

(72) Inventors: Minghui Yang, Shanghai (CN); Neil Woodall, Newport Beach, CA (US)

(73) Assignee: PIXELWORKS, INC., Portland, OR (US)

( * ) Notice: Subject to any disclaimer, the term of this patent is extended or adjusted under 35 U.S.C. 154(b) by 0 days.

(21) Appl. No.: 15/833,719

(22) Filed: Dec. 6, 2017

(51) Int. Cl.
*H04N 7/01* (2006.01)
*H04N 11/20* (2006.01)
*H04N 5/14* (2006.01)

(52) U.S. Cl.
CPC ........... *H04N 7/0127* (2013.01); *H04N 5/145* (2013.01); *H04N 7/014* (2013.01)

(58) Field of Classification Search
CPC ........ H04N 7/01; H04N 11/20; H04N 7/0127; H04N 5/145; H04N 11/18; H04N 7/014
USPC ........................................ 348/441, 452, 497
See application file for complete search history.

(56) References Cited

U.S. PATENT DOCUMENTS

| 7,206,026 | B2* | 4/2007 | Hsiung | G06T 1/60 348/441 |
| 8,107,007 | B2* | 1/2012 | Ogino | H04N 7/015 348/441 |
| 8,395,700 | B2* | 3/2013 | Ueno | G09G 3/20 348/441 |
| 9,552,623 | B1* | 1/2017 | Cheng | G06T 3/4007 |
| 2011/0032419 | A1* | 2/2011 | Sakaniwa | H04N 7/0132 348/452 |

* cited by examiner

Primary Examiner — Trang U Tran
(74) Attorney, Agent, or Firm — Miller Nash Graham & Dunn LLP (57) ABSTRACT

A method of displaying variable rate video data includes receiving a signal from a display indicating that the display is ready to accept a frame of video data, analyzing image content of scenes in the video data, using the image content of scenes in the video data to cluster the scenes into scene types based upon a motion level, adjusting motion estimation and motion compensation to produce a variable output frame rate of the video data not synchronized with an input frame rate, the variable output frame rate based upon the scene type, wherein the variable output frame rate employs interpolated frames, wherein interpolated phases used to form the interpolated frames are determined by the motion level and a phase relationship between the input frames and the display timing, receiving the video data at the variable output frame rate at a display panel, and displaying the video data at the variable output frame rate.

9 Claims, 6 Drawing Sheets

ADJUSTING INTERPOLATION PHASE FOR MEMC USING IMAGE ANALYSIS

BACKGROUND

Popularly, use of Motion Estimation and Motion Compensation (MEMC) technology reduces the film judder and motion blur effect when users watch file or video on a TV or computer monitor. On a mobile device, MEMC technology also increases the viewing experience.

Currently, most of the display panels on mobile devices support up to 60 Hz frequency display. MEMC technology can support the frame rate conversion from low frequency, such as film at 24 frames per second, to 60 Hz, or 120 Hz, if the panel supports it. It would have higher power consumption if the film or video displays at 60 Hz. A variable frame rate for command mode technology could reduce the power consumption without affecting the viewing experience.

DETAILED DESCRIPTION OF THE EMBODIMENTS

As used here, the term 'command mode' refers to a mode of the display device in which the video processor transmits input video frames to a video frame buffer and the input video frames are stored in the video frame buffer. The display driver fetches the input video frame from the video frame buffer if it has changed and waits until the display sends a command signal that it is ready to receive them. That is, the timing of transfers is determined by the display and not processor's the display driver. The display keeps a copy of the latest frame in its own frame buffer so that the update from the processor only occurs when there is new data. The term 'video mode,' the processor determines the timing of the video continuously transmits data to the display driver, the display driver continuously transmits data to the display and the display does not store the video in a frame buffer.

In the embodiments here, the command mode the variable frame rate can decrease the power consumption by the MEMC technology and push the video processing logic down stream. The processes here cluster the content of the scenes into a set of types. In one embodiment, the process clusters into four types based on the motion information such as high motion, middle motion, low motion, and very low motion. In the embodiments here, MEMC will change the output frame rate of the scene based on the motion type.

Figure 1:
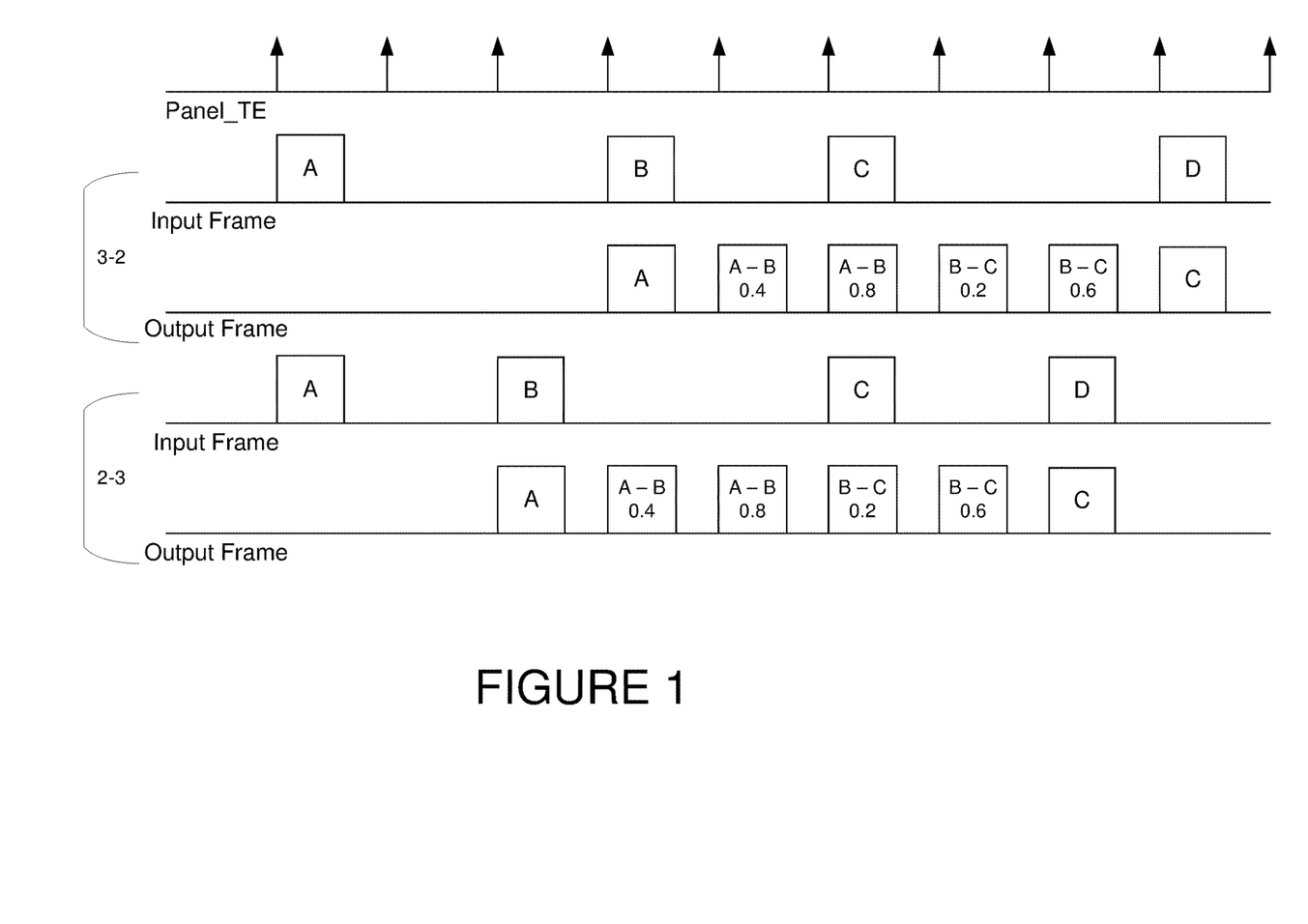
FIGS. 1-4 show embodiments of interpolation phases for different types of motion levels.
Figure 2:
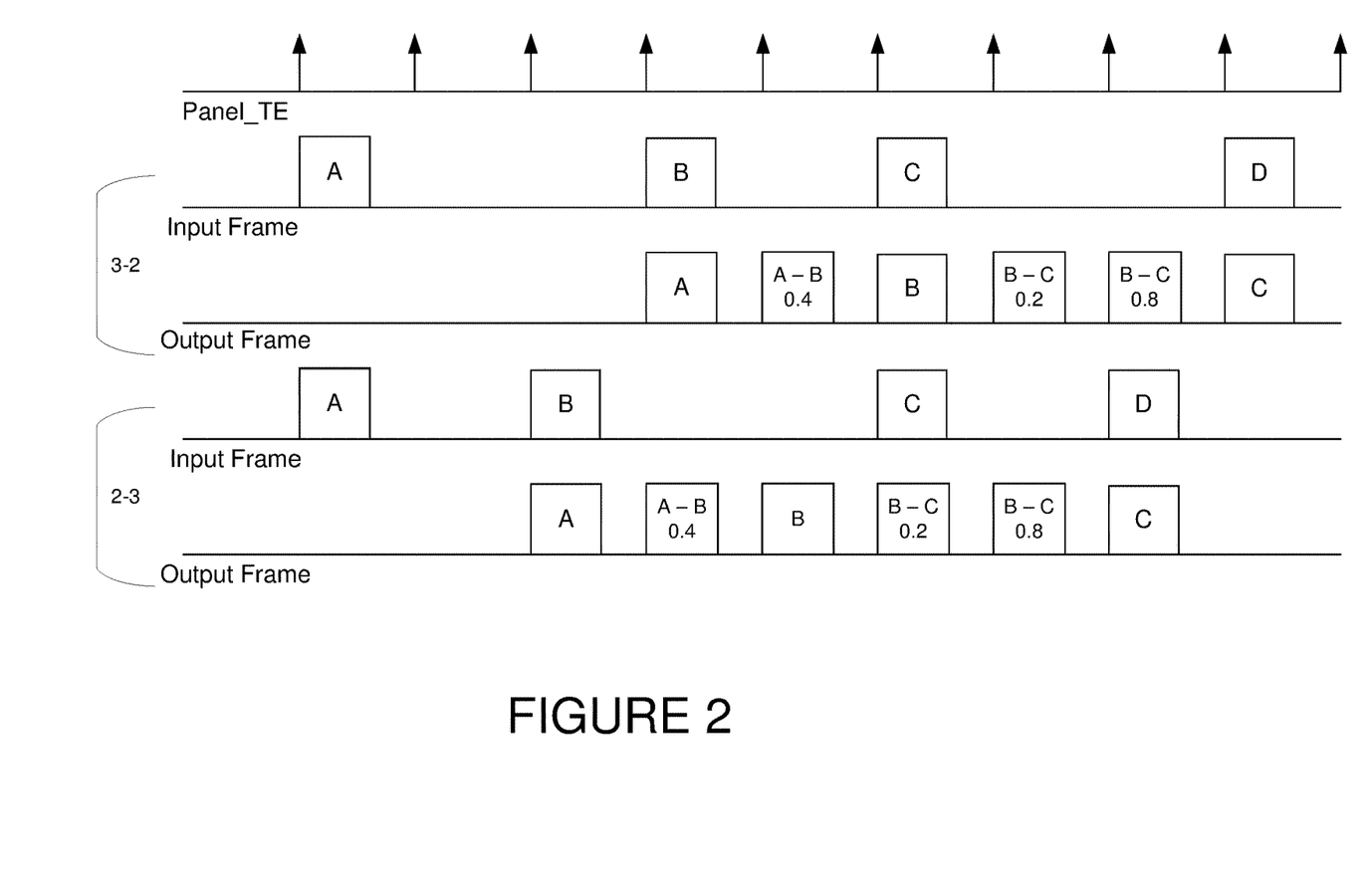
Figure 3:
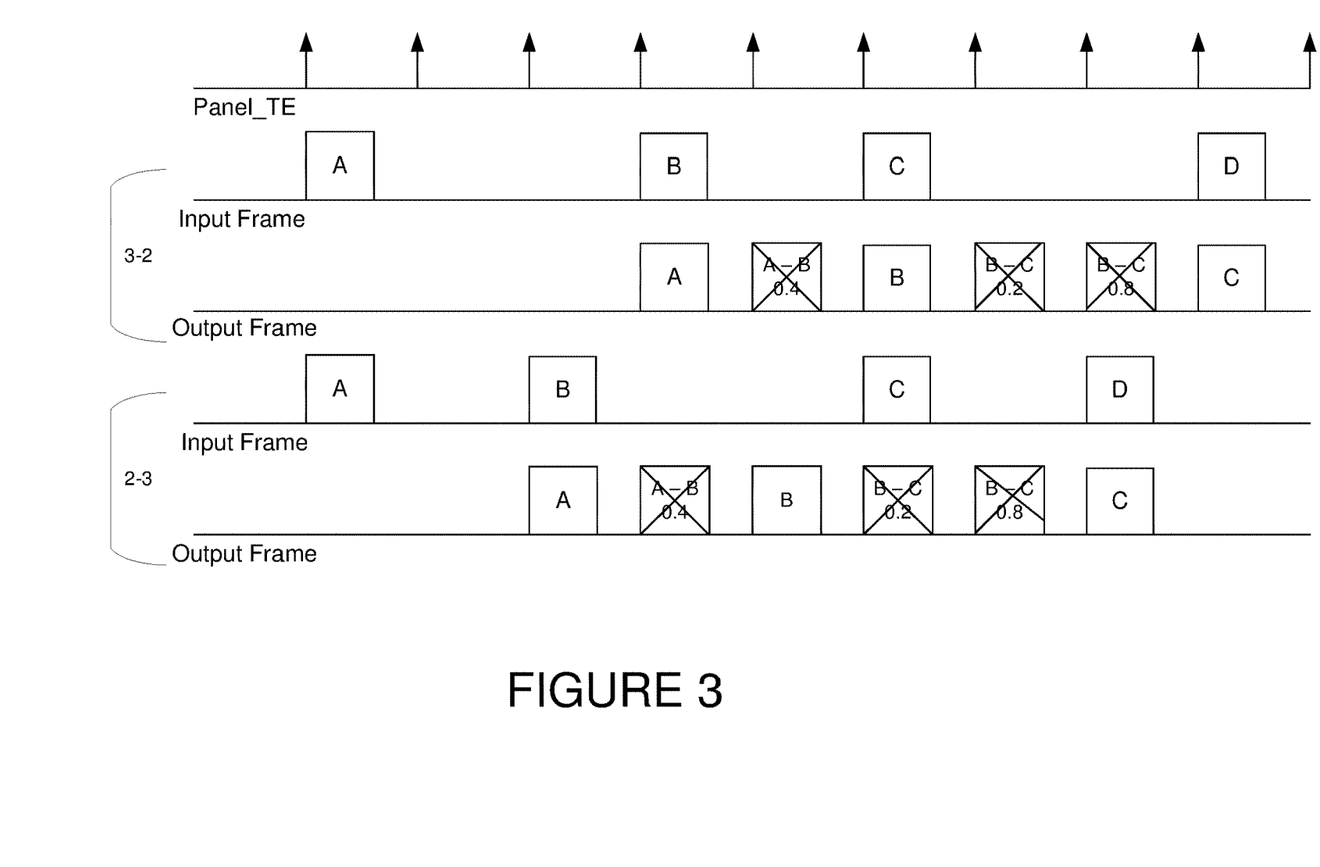
Figure 4:
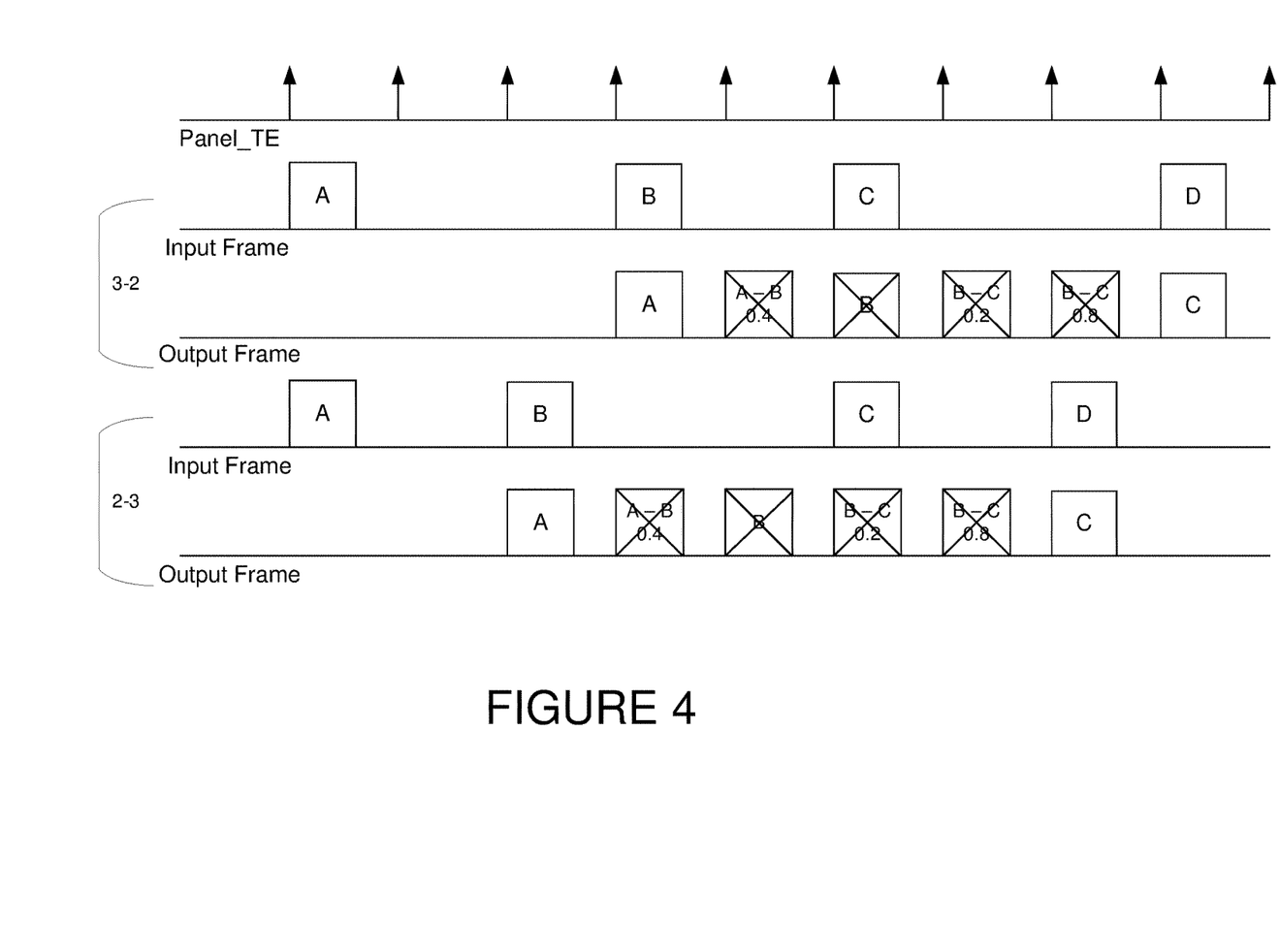

FIG. 1 shows a frame diagram of a high motion type, with 24 frames per second (fps) input and 60 fps output. The top line in this diagram and diagrams for FIGS. 2-4 shows the Tearing Effect signal. Screen tearing occurs when a display device shows information from multiple frames in a single screen image. Command mode panels have a Tearing Effect signal that coordinates the display of frames to avoid screen tearing. The first two lines are the input frame and the output frame for a 3-2 interpolation, and the bottom two lines are the input frame and the output frame for a 2-3 interpolation. The letters A, B, C, and D indicate frames, and the frames labeled like 'A-B 0.4' indicate frame interpolation between frames A and B, at the 0.4 phase between them.

For high motion scenes, the judder effect with be obvious when the original film displayed at 24 fps. The panel needs full MEMC to remove the film judder and motion blur effect. The output will reach a maximum output frame rate of the panel, such as 60 or 120 fps. With the 24 fps film input and 60 fps output case, motion vector calculations (MVC) will work in 100% of the time and frame interpolation (FI) will work on 80% of the time, to do 4 frames of interpolation. One half of the original frames will be dropped with the interpolation phase. The down-stream video processing block and link to the display will work in 60 fps. Typically, this case will have the highest power consumption.

As defined here, middle motion means a scene having motion, but not fast motion, and judder, but not obvious judder. As shown in FIG. 2, the process can perform less MEMC to reduce judder to save power and can reduce the soap opera effect (SOE) on film. The output frame rate may be 60 fps or 120 fps. With the 24 fps film input and 60 fps output, MVC will work in 90% of the time, with 1 interpolation phase is reduced, and frame interpolation will work in 60% of the time, doing 3 frame interpolations. All the original frames will be kept. The down-stream video processing block and the link to the display will work in 60 fps. This will reduce the power consumption of the MEMC technology by 15-20%.

FIG. 3 shows an embodiment of low motion. Low motion scenes have no obvious motion and almost no judder. The process can do frame repeats to reduce power consumption with affecting the viewing experience. The output frame rate can be the input frame rate. With the 24 fps film input case, MVC will only work in 40% of the time, only on the original frame and frame interpolation will not work as shown by the crossed-out frames. The down-stream video processing bock and the link to the display will work in 24 fps. This will reduce power consumption about 90% for the MEMC technology and the downstream video processing logic will use about 60% power consumption.

FIG. 4 shows an embodiment of very low motion. Very low motion scenes have almost no noticeable motion of just some small object with tiny motion in the scene. The process can do frame drops to reduce most of the power consumption. The output frame rate can be lower than the original input frame rate. With the 24 fps film input case, MVC will only work 40% of the time, only on the original frame, and frame interpolation will not work. The down-stream video processing block and link to the display will work in 12 fps. This will reduce about 90% power consumption of the MEMC technology, and 80% power consumption of downstream video processing logic.

A problem arises when the panel is command mode. The timing of the input video must be kept at the desired 24 fps so that it stays in sync with the audio or does cause a buffer over/under condition if the input is live streaming. However, the display timing cannot be changed to be a rational multiple of the source because it is running from a separate clock source. In addition, if the output frame rate of the MEMC does not match the display panel timing for the tearing effect signal or command either MEMC will not have a new frame to display or the display will not be ready for a new frame. This will result in either repeating or dropping a frame at the display. The goal of MEMC is to eliminate Judder to create smooth motion. If a frame is repeated or dropped, it will be more obvious than before because of the smoother motion.

The embodiments here provide a method to analyze the content of the scene and to switch modes between different motion types. Because the output frame of the command mode must be aligned to the Panel_TE signal to avoid the frame tearing the process requires multiple sets of interpolation phases for a given motion type. Further, the process may also need a phase spread method to smooth the transition between different motion types. The Panel_TE signal may be a separate signal, or it may be a command, but for purposes of discussion here, the term 'signal' will include both options.

Figure 5:
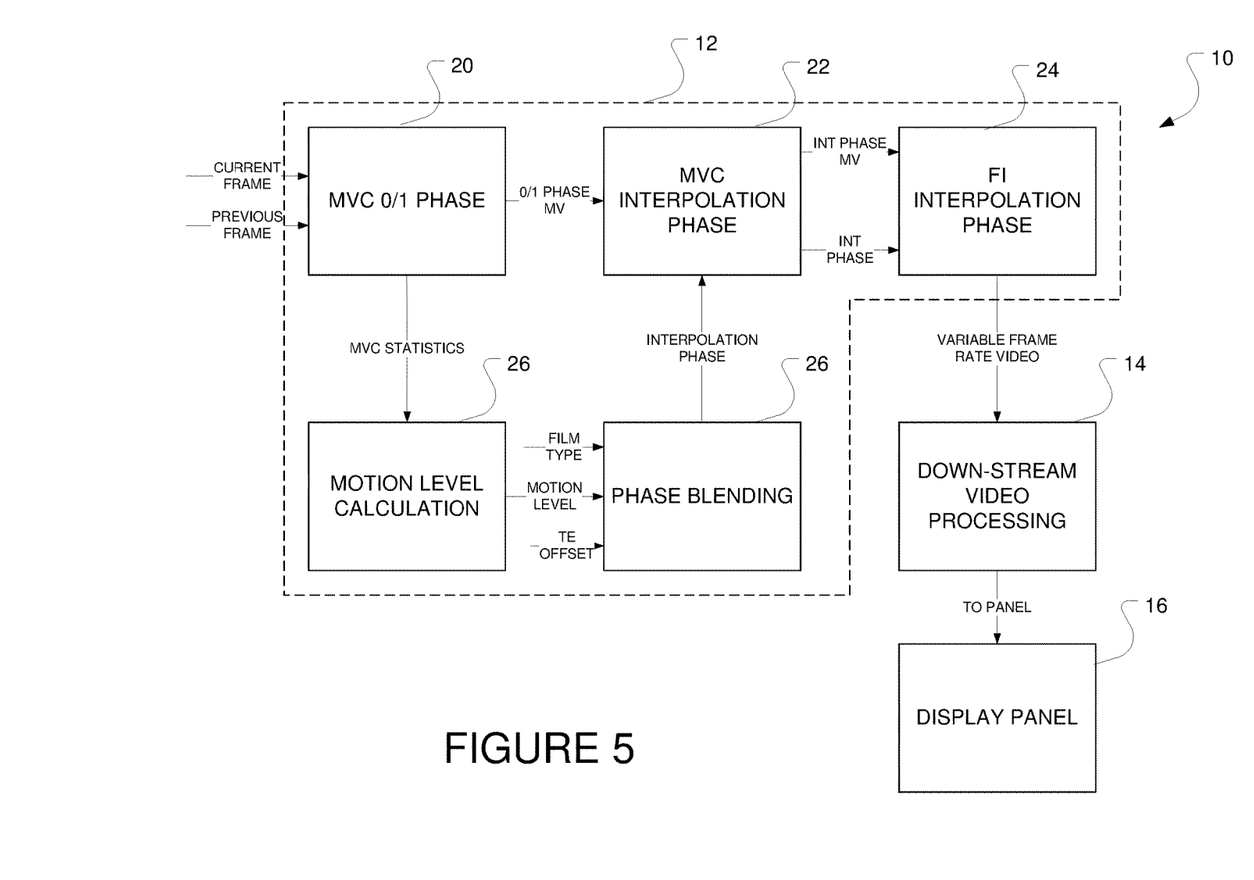
FIG. 5 shows a system level diagram of an embodiment of a display system for variable frame rate output.

FIG. 5 shows a system level diagram for a variable frame rate display system 10. The system may include other components not shown, such as a receiver for receiving the image data, and a general purpose or system processor. The box 12 may designate components of a post-processor or video processor, or each functional block may be implemented in a logic circuit, such as a field programmable gate array, ASIC, or other logic circuitry. One should note that the designation of those blocks as part of a processor may also include the down-stream video processing circuit 14. A display panel 16 displays the variable frame video at the end of the process.

As shown in FIG. 5, the motion vector calculation (MVC) function 20 works on the original frame of video data. The MVC function also receives the previous frame of video data. The MVC block 20 generates the 0 and 1 phases from the original frame and provides them to the MVC interpolation phase block 22. As will be discussed later the MVC function also generates MVC statistics that will be used by the motion level calculation block 26.

The motion level calculation function 26 analyzes the motion level of the scene and determine the motion level type. A phase blending function 28 uses the motion level, scene type and tearing effect offset, TE_OFFSET, to produce a phase number and phase value for the motion vector calculation and frame interpolation. The motion vector calculation (MVC) block 22, then uses the 0/1 phase motion vectors and the interpolation phase to generate the interpolation phase motion vectors. The frame interpolation phase block generates the needed interpolation frames based on the motion vector and sends the variable rate content, such as the 60 or 24/12 fps results) to the down-stream video processing blocks 14. These blocks then send the variable frame rate content to the display panel 16 in the command mode.

The embodiments here use known MEMC processing in conjunction with the unique motion level calculation and phase blending. The motion level calculation function receives the statistics from the MVC function at the fallback strategy block 32, discussed in more detail further, to auto-detect the motion level, which correspond to the 4 motion types, of the video content. The statistics may result from histogram analysis at 30 on the motion vector values of each frame and the MVC block-matching error information. The motion vector value of each frame may be binned with the other motion vectors in a histogram to determine an overall motion vector measure for the scene.

Figure 6:
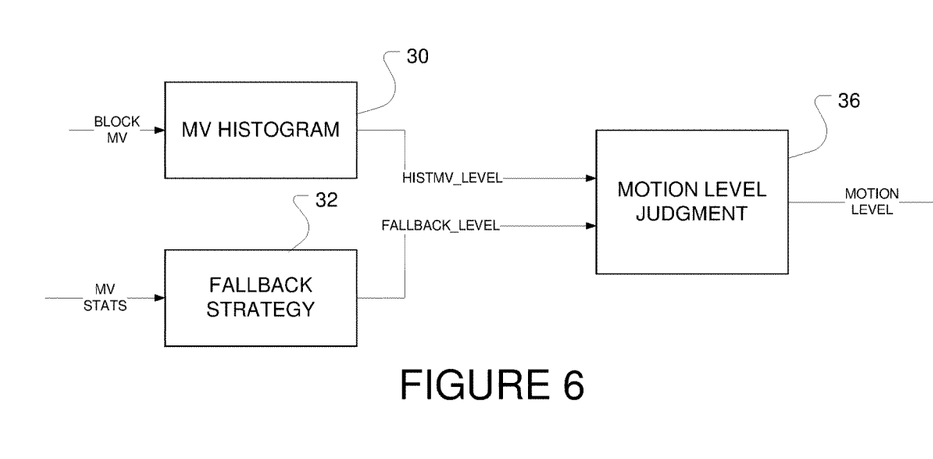
FIG. 6 shows an embodiment of a motion level calculation circuit block.

FIG. 6 shows how the motion level calculation function working. The MV histogram function 30 will construct a MV histogram table (histMV[k]) based on the MV value of each block from the MVC function and then generates the HistMV_level based on the histogram table of the entire frame. The HistMV_level will be used to indicate the motion speed of the entire frame, such as HistMV_level=0 would be a static image or very low motion.

For each block:

$MV\_value = \max(abs(block\_MV.x), abs(block\_MV.y));$ if $(MV\_value >= histMV\_threshold\_k)$ $histMV[k] = histMV[k]+1.$ For the entire frame:

If $(histMV[k] >= MtnLevelCntThr) HistMV\_level = k.$

The fallback strategy function 32 gets the statistics that can be used to denote the MVC block-matching error from the MVC function and then decides the fallback level.

When the fallback level is high, it means the MVC function is not working properly and it needs to reduce the interpolation frame and keep more original frames. Those statistics include following:

SADSum: Sum of absolute difference using block MV matching of entire frame.

OutlierSum: Sum of pixels which has large difference using block MV matching of entire frame.

MotionBlkSum: Sum of blocks with motion in the entire frame.

Here large SADSum values or OutlierSum values mean the block MV cannot properly denote the motion between current frame and previous frame. This is often caused by complex motion or object deformation. If the MotionBlkSum is low, the SADSum and OutlierSum should be lower. So the fallback_level can be $Fallback\_level = \max(k1*SADSum, k2*OutlierSum)/MotionBlkSum.$ The motion level judgement function 36 combines the HistMV_level and Fallback_level information and then decides the motion level. Motion level 0 will use full-dejudder phase and the output is 60 Hz, which correspond to large motion. Motion level 1 will keep more original frames to reduce the power of frame interpolation, the output is still 60 Hz, which correspond to middle motion. Motion level 2 will be just frame repeat to reduce the power of MEMC and post-processing, the output is below 30 Hz, which correspond to very small motion. Motion level 3 will do frame drop to reduce more power of MEMC and post-processing, the output is less than 15 Hz, which correspond to still images. In order to reduce the judder level of different motion levels, the process can add 4 middle levels between motion level 0, 1 and 2.

A high_low threshold logic is used to avoid the sudden change of motion level as follows. If current motion level is between [0,1]:

If ((HIST$mv\_$level>Hist$MV\_$high$Thr$0 &&
    cLarge$I$<cLarge$I\_$low$Thr$0) && motion
    level>0) motion level-=0.25; // 4 middle level
    between 0,1.

If
    ((HIST$mv\_$level<=Hist$MV\_$low$Thr$0||cLarge$I$>cLarge$I\_$high$Thr$0)
    && motion level<1) motion level+=0.25;

If current motion level is between [1,2]:

If (HIST$mv\_$level>Hist$MV\_$high$Thr$1 &&
    cLarge$I$<cLarge$I\_$low$Thr$1 and motion level>1)
    motion level-=0.25; // 4 middle level between
    1,2

If
    (HIST$mv\_$level<=Hist$MV\_$low$Thr$1||cLarge$I$>cLarge$I\_$high$Thr$1
    and motion level<2) motion level+=0.25;

If current motion level is between [2,3]:

If (HIST*mv*_level>0||*c*Large*I*>*c*Large*I*_High*Thr*2 and
motion level==3) motion level=2; // there have
motion or the *SAD*/outlier is high, and the process cannot drop frames.

If (HIST*mv*_level==0 && *c*Large*I*<*c*Large*I*_low*Thr*2
and motion level==2) motion level=3.

Figure 7:
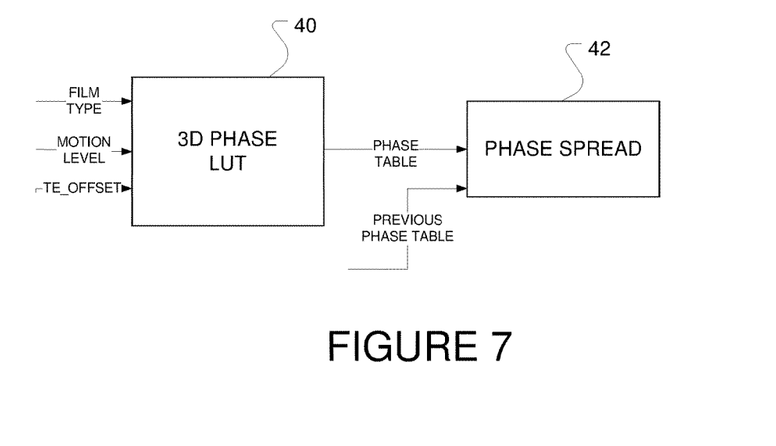
FIG. 7 shows an embodiment of a phase blending circuit block.

The discussion now turns to the phase blending function of FIG. 7, which uses a 3D phase LUT 40, shown below as Table 1, to generate the interpolation phase based on the motion level, input frame rate and TE_offset value. Each entry of the LUT is a series of phase values. To support 25→60 Hz up-conversion, there will be 12 phases in the LUT. If the process needs to support some uncommon input, such as 16 fps input, the number of phase entries needs to be larger (16:60=4:15). The phase table of middle-level between motion level 0, 1 and 2 can be interpolated using phase table of motion level 0, 1 and 2.

Here TE_offset means the TE signal has an offset value between input signal and the display panel TE. It is caused because command mode display timing is not synchronized to the input frame rate. In the 3D phase LUT, the TE_offset is quantized to be 10 TE_offset and each TE_offset interval is 0.1. After the motion level is calculated, the target phase can be selected from the 3D phase LUT 42 based on the motion level, TE_offset, and input frame rate, such as motion level 0, TE_offset=0 and 24 fps input, one can get the phase table: 0, 0.4, 0.8, 1.2, 1.6. When motion level or TE_offset changes, one can get another group of phase table.

In the patent disclosure table (what you have isn't the same as the one I sent I think), if you are increasing the phase offset, you effectively increasing the distance between phases and eventually generate slightly fewer output frames than would be expected, which is required because the output is running faster (i.e. there is less time to output the expected number of frames). For example, in the 24 fps→60 fps as you go from TE offset table to the next highest one, all the phase values increase by 0.1 for the high motion case. Finally, after reaching the TE offset phase of 0.9, the next TE offset phase will be 0.0. At this point the phase decreases by −0.9, but because this means that the TE signal has rolled over, the logic increments the frame buffer points to advance the input frames by 1 which provide the correct increase of 0.1 (0.1=1−0.9).

In order to avoid judder caused by sudden phase change of different phase table caused by a change in motion level, a phase spread method can be used to smooth the transition. The phase spread function is used to spread the phase transition into several frames, such as 5 frames for 24 fps content. In the embodiments here, the process updates the motion level every 2 input frames. Here the speed of phase spread can be controlled by a blending factor as following:

Phase=phase_pre+*k**(phase_cur−phase_pre), where k=max(1, blending factor*number). For example, when the blending_factor=0.2 for 24 fps case. Then it will take 5 output frames to switch from old phase table to new phase table.

An example follows:

| motion level 0: | 0, | 0.4, | 0.8, | 1.2, | 1.6 |
| motion level 0.25: | 0, | 0.4, | 0.85, | 1.2, | 1.65 |
| motion level 1: | 0, | 0.4, | 1, | 1.2, | 1.8 | when motion level 0 switches to level 1, the phase would be 0, 0.4, 0.8, 1.2, 1.6, 2, 2.4, 2.88, 3.2, 3.76, 4, 4.4, 5, 5.2, 5.8 . . . . Phases in bold correspond to the transition steps.

If one has 4 middle-level between 0 and 1, when motion level 0 switches to level 0.25, the phase would be 0, 0.4, 0.8, 1.2, 1.6, 2, 2.4, 2.82, 3.2, 3.64, 4, 4.4, 4.85, 5.2, 5.65 . . . . Phases in bold correspond to the transition steps.

TABLE 1

3D phas LUT for Variable frame rate in command mode

| | | Phase | | | | | | | | | | | |
|---|---|---|---|---|---|---|---|---|---|---|---|---|---|
| | | 0 | 1 | 2 | 3 | 4 | 5 | 6 | 7 | 8 | 9 | 10 | 11 |
| Motion Level 0 | 24 fps | 0 | 0.40 | 0.80 | 1.20 | 1.60 | | | | | | | |
| | 25 fps | 0 | 0.42 | 0.83 | 1.25 | 1.67 | 2.08 | 2.50 | 2.92 | 3.33 | 3.75 | 4.17 | 4.58 |
| | 30 fps | 0 | 0.50 | 1.00 | | | | | | | | | |
| | 10 fps | 0 | 0.17 | 0.33 | 0.50 | 0.67 | 0.83 | | | | | | |
| | 12 fps | 0 | 0.20 | 0.40 | 0.60 | 0.80 | | | | | | | |
| | 15 fps | 0 | 0.25 | 0.50 | 0.75 | | | | | | | | |
| | 20 fps | 0 | 0.33 | 0.67 | | | | | | | | | |
| Motion Level 1 | 24 fps | 0 | 0.40 | 1.00 | 1.20 | 1.80 | | | | | | | |
| | 25 fps | 0 | 0.40 | 1.00 | 1.20 | 1.80 | 2.00 | 2.40 | 3.00 | 3.20 | 3.80 | 4.00 | 4.40 |
| | 30 fps | 0 | | 1.00 | | | | | | | | | |
| | 10 fps | 0 | 0.17 | 0.33 | 0.50 | 0.67 | 0.83 | | | | | | |
| | 12 fps | 0 | 0.20 | 0.40 | 0.60 | 0.80 | | | | | | | |
| | 15 fps | 0 | 0.25 | 0.50 | 0.75 | | | | | | | | |
| | 20 fps | 0 | 0.33 | 0.67 | | | | | | | | | |
| Motion Level 2 | 24 fps | 0 | | 1.00 | | 2.00 | | | | | | | |
| | 25 fps | 0 | | 1.00 | | 2.00 | | 3.00 | | 4.00 | | | |
| | 30 fps | 0 | | 1.00 | | | | | | | | | |
| | 10 fps | 0 | | | 0.50 | | 1.00 | | | | | | |
| | 12 fps | 0 | | 0.40 | | 1.00 | | | | | | | |
| | 15 fps | 0 | | 0.50 | 1.00 | | | | | | | | |
| | 20 fps | 0 | | | 1.00 | | | | | | | | |

TABLE 1-continued 3D phas LUT for Variable frame rate in command mode

| | | Phase | | | | | | | | | | | |
|---|---|---|---|---|---|---|---|---|---|---|---|---|---|
| | | 0 | 1 | 2 | 3 | 4 | 5 | 6 | 7 | 8 | 9 | 10 | 11 |
| Motion Level 3 | 24 fps | 0 | | | | | 2.00 | | | | | | |
| | 25 fps | 0 | | | | | 2.00 | | | | | 4.00 | |
| | 30 fps | 0 | | | | 2.00 | | | | | | | |
| | 10 fps | 0 | | | | | | 1.00 | | | | | |
| | 12 fps | 0 | | | | | 1.00 | | | | | | |
| | 15 fps | 0 | | | | 1.00 | | | | | | | |
| | 20 fps | 0 | | | | | | 2.00 | | | | | |

In this manner, a system can output a variable frame rate to decrease the power used by the MEMC technology and the down-stream video processing logic while adapting to display timing that is asynchronous to the input video timing.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method of displaying variable rate video data, comprising:
    receiving a signal from a display panel indicating that the display is ready to accept a frame of video data;
    analyzing image content of scenes in the video data;
    using the image content of scenes in the video data to determine scene types based upon a motion level;
    adjusting motion estimation and motion compensation to produce a variable output frame rate of the video data not synchronized with an input frame rate, the variable output frame rate based upon the scene type, wherein the variable output frame rate employs interpolated frames, wherein interpolated phases used to form the interpolated frames are determined by the motion level and a phase relationship between the input frames and the display timing;
    transmitting the video data at the variable output frame rate to a display panel; and
    displaying the video data at the variable output frame rate.

2. The method of claim 1, wherein analyzing image content of scenes in the video data comprises:
    performing motion vector calculations to produce motion statistics; and
    detecting the motion level to determine the scene type from the motion statistics.

3. The method of claim 2, wherein the motion statistics comprise histograms on motion vector values for each frame of video data.

4. The method of claim 2, wherein the motion statistics comprise motion vector calculations and block-matching error information.

5. The method of claim 4, further comprising using the block-matching error information to determine a fallback level.

6. The method of claim 5, further comprising using the fallback level to determine a reduction of interpolation frames and increase the use of original frames.

7. The method of claim 1, wherein adjusting the motion estimation and motion compensation comprises:
    using the motion level to generate an interpolated phase number and phase value;
    producing interpolation phase motion vectors based upon the interpolated phase number and the phase value; and
    generating the interpolation frames based upon the interpolation phase motion vectors.

8. The method of claim 7, wherein using the motion level to generate an interpolated phase number and phase value comprises using a three-dimensional phase look up table to generate the interpolated phase number, phase value and tearing effect offset value.

9. A method of displaying variable rate video frame data, comprising:
    performing motion vector calculations on original video data to generate zero phase and one phase motion vector and motion statistics;
    analyzing the motion statistics to determine a motion level of the video data;
    generating an interpolated phase number and phase value from the motion level, scene type and a tearing effect signal;
    using the phase number and phase value to produce interpolation phase motion vectors;
    interpolating frames based upon the interpolation phase motion vectors;
    transmitting the interpolated frames to video processing logic; and
    displaying the interpolated frames on a display panel.

* * * * *